(12) United States Patent
Uematsu et al.

(10) Patent No.: US 7,028,578 B2
(45) Date of Patent: Apr. 18, 2006

(54) WRIST DRIVING MECHANISM FOR ROBOT

(75) Inventors: Masaaki Uematsu, Kohu (JP);
Kuniyasu Matsumoto, Yamanashi (JP);
Hiroshi Nakagawa, Yamanashi (JP);
Masahiro Morioka, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 266 days.

(21) Appl. No.: 10/401,789

(22) Filed: Mar. 31, 2003

(65) Prior Publication Data
US 2003/0192391 A1    Oct. 16, 2003

(30) Foreign Application Priority Data
Apr. 11, 2002  (JP) ............................. 2002-109726

(51) Int. Cl.
*B25J 17/00*  (2006.01)
*B25J 17/02*  (2006.01)
*B25J 18/00*  (2006.01)

(52) U.S. Cl. ................... 74/490.05; 414/918; 414/735; 901/29

(58) Field of Classification Search ............. 74/490.01, 74/490.02, 490.05; 901/25, 26, 28, 29; 414/918, 414/735
See application file for complete search history.

(56) References Cited

U.S. PATENT DOCUMENTS 4,492,510 A * 1/1985 Tanii et al. ................. 414/733
4,642,021 A   2/1987 Kikuchi
4,645,409 A * 2/1987 Gorman ...................... 414/735
4,688,984 A * 8/1987 Nakashima et al. ........ 414/735

(Continued)

FOREIGN PATENT DOCUMENTS

EP          0 249 232         12/1987

(Continued)

OTHER PUBLICATIONS

Notification of Grounds for Rejection dated Aug. 24, 2004.

Primary Examiner—David Fenstermacher
(74) Attorney, Agent, or Firm—Staas & Halsey LLP

(57) ABSTRACT

A wrist driving mechanism capable of arranging a large amount of cables and pipes in a robot arm. A robot wrist mechanism having three degrees of freedom is driven by first, second and third drive shafts for transmitting driving forces of first, second and third motors M4, M5 and M6, respectively. The first drive shaft is a hollow shaft for transmitting a rotational driving force from the motor M4 to a first wrist element supported rotatably around the first axis B1. The second and third drive shafts are arranged eccentrically with the first axis B1 in an inner space of the first drive shaft. The second drive shaft transmits a rotational driving force from the motor M5 to a second wrist element supported rotatably around the second axis B2, and the third drive shaft transmits a rotational force from the motor M6 to a third wrist element supported rotatably around the third axis B3. A first gear and a third gear as planet gears and a second gear and a fourth gear as sun gears are provided for avoiding complication of structure due to the eccentric arrangement of the second and third drive shafts.

8 Claims, 3 Drawing Sheets

U.S. PATENT DOCUMENTS

| | | | | |
|---|---|---|---|---|
| 4,804,304 | A | * | 2/1989 | Tellden .................. 414/735 |
| 4,972,735 | A | * | 11/1990 | Torii et al. ............... 74/665 M |
| 5,251,500 | A | * | 10/1993 | Torii et al. ............... 74/490.03 |
| 5,549,016 | A | * | 8/1996 | Nakako et al. .......... 74/490.02 |
| 5,924,330 | A | * | 7/1999 | Danielsson et al. ...... 74/490.06 |
| 6,389,921 | B1 | * | 5/2002 | Nada ..................... 74/490.02 |
| 6,455,799 | B1 | * | 9/2002 | Forslund et al. ......... 219/86.25 |
| 6,860,169 | B1 | * | 3/2005 | Shinozaki ................ 74/490.06 |

FOREIGN PATENT DOCUMENTS

| | | |
|---|---|---|
| EP | 0 873 826 | 10/1998 |
| EP | 0 873 826 B1 | 10/1998 |
| JP | 62-292387 | 12/1987 |
| JP | 2000-334689 | 12/2000 |

* cited by examiner

WRIST DRIVING MECHANISM FOR ROBOT

BACKGROUND OF THE INVENTION

1. Field of the Invention

The present invention relates to a driving mechanism of a wrist of a robot, and in particular to a technique for securing a sufficient space for arranging cables/pipes for supplying energy and/or fluid to a tool to be attached to an end of the wrist without complication of structure of the driving mechanism.

2. Description of Related Art

There is known a wrist driving mechanism having three degrees of freedom around three axes and a space for arranging cables/popes in a robot arm, as disclosed in JP 2000-334689A and EP 0873826B1. In the prior art, hollow drive shafts having different diameters for the three axes are concentrically arranged along an axis of rotation of the robot arm for providing the space for arranging the cables/pipes in the inner hollow shaft.

In the above structure, in order to arranging a large number of cables/pipes in the space in the inner hollow drive shaft, it is necessary to design diameters of the drive shafts for the three axes larger to secure a sufficient space in the inner shaft. However, if the diameters of the drive shafts are made larger, a diameter of the robot arm is made greater to increase a possibility of causing an interference between the robot arm and a peripheral device in an operation of the robot. Further, weight of the robot arm increases to lower controllability of the robot.

SUMMARY OF THE INVENTION

An object of the present invention is to improve the wrist driving mechanism for the robot such that a sufficient space for arranging cables and/or wrist is provided in the robot arm.

Another object of the present invention is to improve the wrist driving mechanism such that driving sources for the three axes of the wrist driving mechanism are enabled to be mounted on a wrist mounting base to avoid complication of the wrist driving mechanism.

The present invention provides a robot wrist driving mechanism for driving a wrist mechanism provided at a distal end of an robot arm and having three degrees of freedom around first, second and third axes. The robot wrist driving mechanism comprises: first, second and third motors arranged at a proximal portion of the robot arm; a mounting base; a first wrist element supported rotatably on the mounting base around the first axis; a hollow first drive shaft for transmitting a rotational driving force of the first motor to the first wrist element relatively to the mounting base; a second wrist element supported rotatably on the first wrist element around the second axis; a second drive shaft arranged in an inner space of the first drive shaft to be eccentrically with the first axis, for transmitting a rotational driving force of the second motor to the second wrist element relatively to the first wrist element; a third wrist element supported rotatably on the second wrist element around the third axis; and a third drive shaft arranged inside the first drive shaft to be eccentrically with the first axis, for transmitting a rotational driving force of the third motor to the third wrist element relatively to the second wrist element.

The robot wrist driving mechanism may further comprise a first gear fixed at a proximal end of the second drive shaft; a second gear supported on the mounting base rotatably around the first axis and engaged in mesh with the first gear; a third gear fixed at a proximal end of the third drive shaft; and a fourth gear supported on the mounting base rotatably around the first axis and engaged in mesh with the third gear, and the second drive shaft and the third drive shaft may be supported on the first drive shaft revolvable around the first axis with the rotation of the first wrist element.

With the above arrangement, a region for arranging cables and/or pipes for a tool to be attached to the third wrist element is formed around the first axis in the inner space of the first drive shaft.

DETAILED DESCRIPTION OF THE PREFERRED EMBODIMENTS

Figure 1:
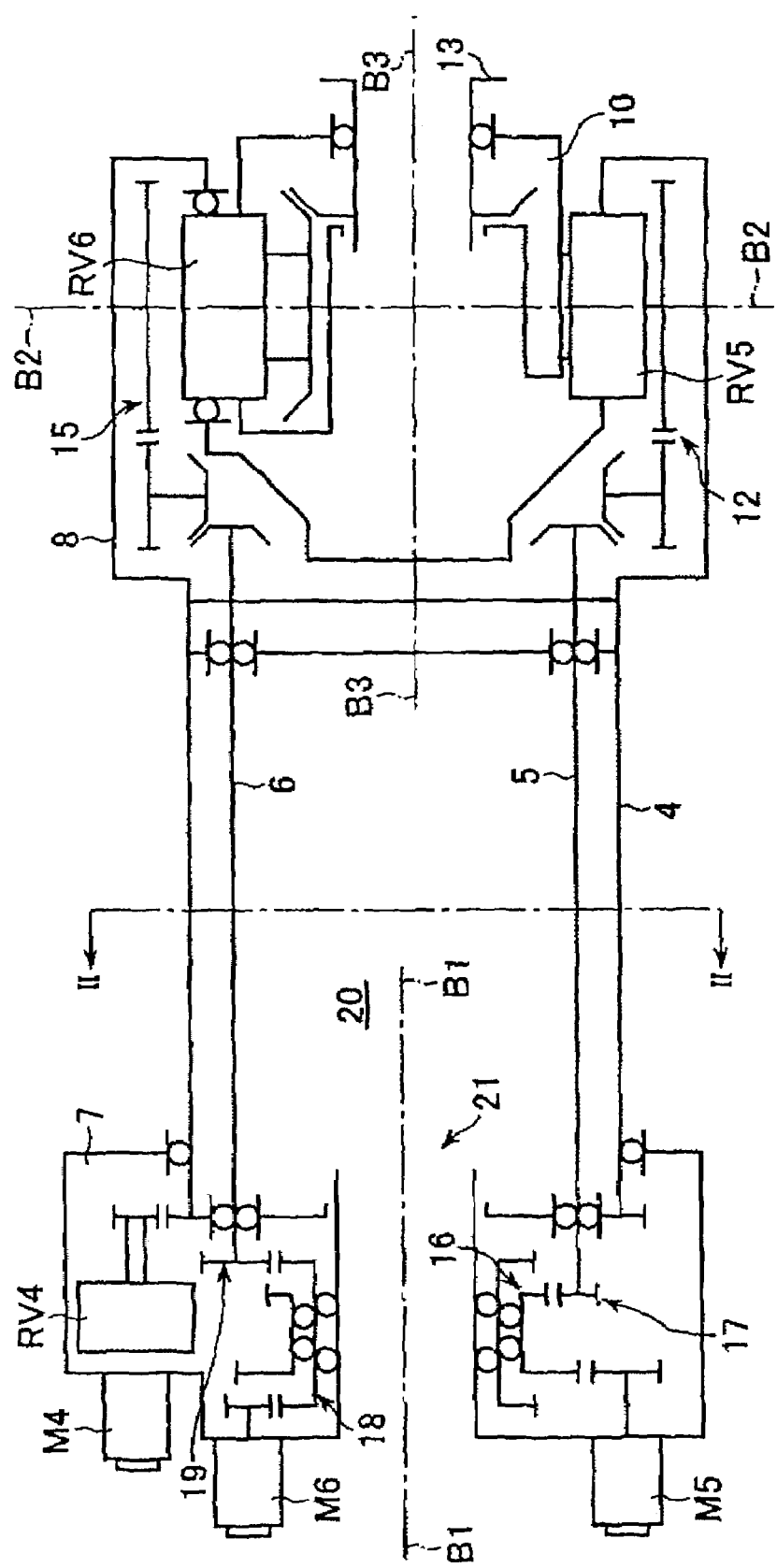
FIG. 1 is a schematic diagram of a robot wrist driving mechanism according to an embodiment of the present invention.

FIG. 1 schematically shows a robot wrist driving mechanism for driving a wrist mechanism provided at a distal end of a robot arm according to an embodiment of the present invention.

The robot wrist mechanism has three degrees of freedom around three different wrist axes of a first axis B1, a second axis B2 and a third axis B3, and a first motor M4, a second motor M5 and a third motor M6 are provided at a proximal portion of a robot arm as driving sources of the three wrist axes B1, B2 and B3, respectively.

Three drive shafts of a first drive shaft 4, a second drive shaft 5 and a third drive shaft 6 are used for transmitting driving power of the first, second and third motors M4, M5 and M6 to first, second and third wrist elements 8, 10 and 13, respectively. The first drive shaft 4 is an elongated hollow shaft having a diameter larger than those of the second and third drive shafts 5 and 6. The second drive shaft 5 and the third drive shaft 6 are arranged in an inner space 20 of the hollow first drive shaft 4.

Figure 2:
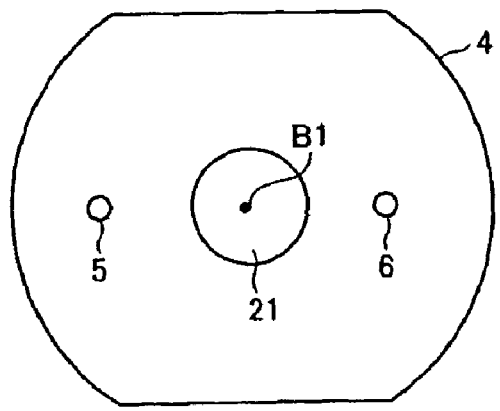
FIG. 2 is a cross-sectional view of the wrist driving mechanism as shown in FIG. 1 along a line II—II perpendicular to a first axis B1 for showing relative positions of first, second and third drive shafts.

Referring to FIG. 2 which shows a cross-section perpendicular to the first axis B1, it is notable that the second drive shaft 5 and the third drive shaft 6 are arranged eccentrically of the first axis B1 by predetermined distances respectively so that an appropriate space is formed between the second and third drive shafts 5 and 6. That is, the three drive shafts 4, 5 and 6 are not arranged concentrically or coaxially.

The first drive shaft 4 is supported on a wrist mounting base 7 rotatably around the first axis B1 as a primary element for transmitting a driving force for rotating the first wrist element 8 around the first axis B1. The first motor M4 is mounted on the wrist mounting base 7 so that a driving force is transmitted to the hollow first drive shaft 4 via a speed reducer RV4. The driving force of the first motor M4 may be transmitted to the first drive shaft 4 directly. The first wrist element 8 is attached to a distal end of the first drive shaft 4 to be rotated around the first axis B1. The first wrist element 8 may be connected to a distal end of the first drive shaft 4 via a speed reducer.

In this embodiment the elongated hollow first drive shaft 4 functions as an arm of a robot. Alternatively, an arm mounted on the wrist mounting base 7 may be provided separately from the first drive shaft 4 such that the drive shaft 4 is arranged inside the arm.

The second drive shaft 5 is an elongated driving element for transmitting a driving force to rotate the second wrist element 10 around the second axis B2 and is arranged in the inner space 20 in the hollow first drive shaft 4 displaced from the first axis B1 by the predetermined distance.

A rotational driving force of the second motor M5 is transmitted to the second drive shaft 5 via transmitting gears, as described later. The second wrist element 10 is mounted and supported on the first wrist element 8 rotatably around the second axis B2. A speed reducing means 12 including a speed reducer RV5 is arranged in the first wrist element 8, and an output shaft of the speed reducer RV5 is connected with the second wrist element 10. A distal end of the second drive shafts 5 is connected to the speed reducing means 12. With this arrangement, the rotational driving force of the second drive shaft 5 is transmitted to the second wrist element 10 through the speed reducing means 12.

The third drive shaft 6 is an elongated driving element for transmitting a driving force to rotate the third wrist element 13 around the third axis B3 and is arranged in the inner space 20 in the hollow first drive shaft 4 displaced from the first axis B1 by a predetermined distance.

A rotational driving force of the third motor M6 is transmitted to the third drive shaft 6 through a transmitting gear train, as described later. A third wrist element 13 is mounted and supported on the second wrist element 10 rotatably around the third axis B3. A speed reducing means 15 including a speed reducer RV6 is arranged in the second wrist element 10, and an output shaft of the speed reducer RV6 is connected with the third wrist element 13. A distal end of the third drive shaft 6 is connected to the speed reducing means 15. With this arrangement, the rotational driving force of the third drive shaft 6 is transmitted to the third wrist element 13 through the speed reducing means 15.

Figure 3:
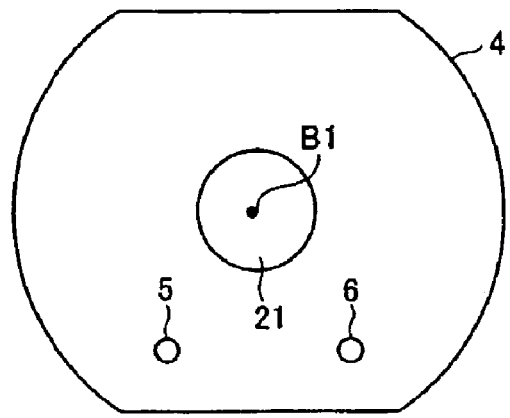
FIG. 3 is a cross-sectional view of another wrist driving mechanism having different relative positions of the first, second and third drive shafts.
Figure 4:
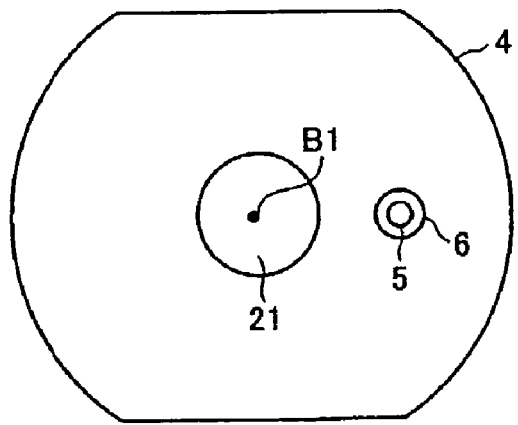
FIG. 4 is a cross-sectional view of still another wrist driving mechanism having different relative positions of first, second and third drive shafts.

The arrangement of the second and third drive shafts 5 and 6 is not restricted to the arrangement as shown in FIG. 2 and may be an arrangement as shown in FIG. 3 or FIG. 4. In the arrangement as shown in FIG. 2, a straight line connecting an axis of the second drive shaft 5 and an axis of the third drive shaft 6 extends on the first axis B1, but the straight line does not extend on the first axis B1 in the arrangement as shown in FIG. 3. In the arrangement as shown in FIG. 4, the third drive shaft 6 is hollow and the second drive shaft 5 is inserted into an inner space of the hollow third drive shaft 6 and arranged concentrically.

As shown in FIGS. 1–4, a region 21 is formed in the wrist driving mechanism along the first axis B1 for arranging cables and/or pipes for supplying electricity, fluid, etc. to a tool (not shown) to be attached to the third wrist element 13. Using the first drive shaft 4 having the same diameter, it is possible to design a sectional area of the region 21 for arranging cables/pipes in the arrangement as shown in FIGS. 2 and 3 to be larger than that of the region 21 for arranging cables/pipes in the arrangement as shown in FIG. 4.

Figure 5A:
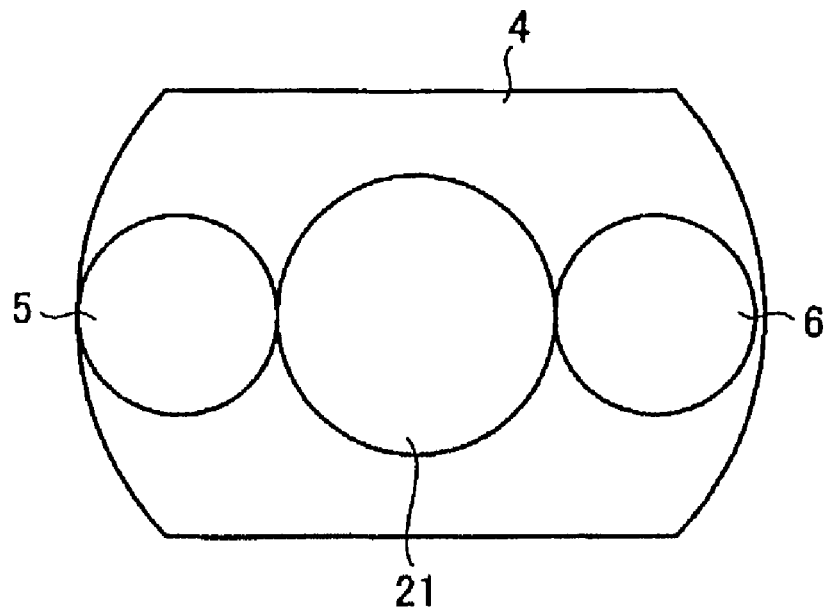
FIG. 5a is a cross-sectional view of a wrist driving mechanism with second and third drive shafts arranged separately.
Figure 5B:
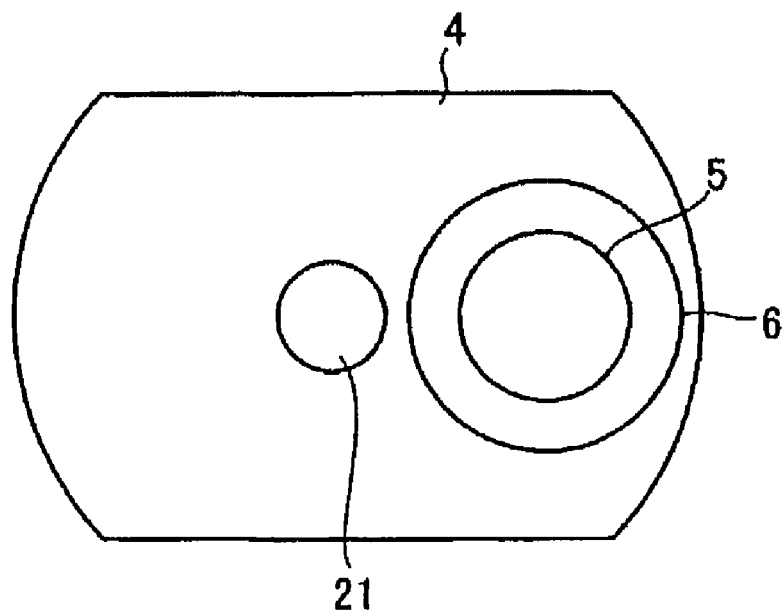
FIG. 5b is a cross-sectional view of a wrist driving mechanism with the second and third drive shafts arranged concentrically.

The reason of the above is described referring to FIGS. 5*a* and 5*b*. In the arrangement where the second drive shaft 5 and the third drive shaft 6 are arranged concentrically as shown in FIG. 5*b*, as long as a diameter of the inner drive shaft, i.e. the second drive shaft 5 in this example, is maintained so as to secure the necessary driving force to be transmitted, a diameter of the outer drive shaft, i.e. the third drive shaft 6 in this example, has to be larger than that of the third drive shaft 6 in the arrangement where the second and third drive shafts 5 and 6 are arranged separately as shown in FIG. 5*a*, so that bearings for supporting the third drive shaft 6 is made larger. Thus, it is difficult to secure a large sectional area of the region 21 for arranging cables/pipes at the center of the first drive shaft 4.

The driving force transmission mechanism will be described further in detail. A first gear 17 is fixed to a proximal end of the second drive shafts. An annular second gear 16 having two sets of teeth is supported on the wrist mounting base 7 rotatably around the first axis B1. One of the teeth sets of the second gear 16 is engaged in mesh with the first gear 17 and the other of the teeth sets is engaged in mesh with an output gear connected with an output shaft of the second motor M5. The first gear 17 functions as a planet gear rotatably supported by the first drive shaft 4 as a planet carrier and revolving around the second gear 16 as a sun gear.

Similarly, a third gear 19 is fixed to at a proximal end of the third drive shaft 6. An annular fourth gear 18 having two sets of teeth is supported on the wrist mounting base 7 at inner side of the second gear 16 rotatably around the first axis B1. One of the teeth sets of the fourth gear 18 is engaged in mesh with the third gear 19 and the other of the teeth sets is engaged in mesh with an output gear connected with an output shaft of the third motor M6. The third gear 19 functions as a planet gear rotatably supported by the first drive shaft 4 as a planet carrier and revolving around the fourth 18 gear as a sun gear.

It should be noted that the second drive shaft 5 and the third drive shaft 6 are arranged eccentrically with respect to an axis of the first drive shaft 4 (the first axis B1) and the second gear 16 and the fourth gear 18 have annular shapes, to allow a room for securing the region 21 for cables/pipes in the inner space 20 of the first drive shaft 4 inside the second gear 16 and the fourth gear 18. This means that the space 21 is provided along the first axis B3 sufficiently for arranging cables/pipes for supplying air, electricity, signal, fluid, etc. to a tool such as a gun and a hand to be attached to the third wrist element 13.

Further, it is advantageous to arrange the second drive shaft 5 and the third drive shaft 6 at outermost positions in the inner space 20 of the first drive shaft 4 in preventing an interference between the drive shafts 5 and 6 and the cables/pipes.

As described above, since the second drive shaft 5 and the third drive shaft 6 are supported independently of each other and so as to be displaced from the first axis B1 with the predetermined distance in the inner space 20 of the first drive shaft 4, it is possible to make diameters of the second and third drive shafts 5 and 6 smaller than those in the conventional arrangement in which the three hollow drive shafts are arranged concentrically for forming the region for cables/pipes in the innermost shaft. This is because it is only necessary for the second and third drive shafts 5 and 6 to have minimum diameters required for transmitting respective drive forces since the concentric relation with the first drive shaft 4 is canceled. In the case of adopting the arrangement of the three drive shafts shown in FIG. 4, it is possible to make the inner drive shaft 5 sufficiently thin, and therefore the diameter of the outer drive shaft 6 is not so large since it is sufficient to have the diameter slightly larger then that of the inner drive shaft 5.

With the above arrangement, the region 21 for arranging cables/pipes for a tool to be attached to the third wrist element 13 is made larger around the first axis B1 by simply making the diameter of the first drive shaft 4 larger.

The transmission of the driving forces by the transmission mechanism including the drive shafts 4–6 and the gears 16–19 will be described in detail.

First, with respect to the third drive shaft 6, a driving force is transmitted to the third drive shaft 6 from the driving source including the third motor M6 to rotate the third drive shaft 6. The driving force is transmitted to the speed reducing means 15 arranged in the first and second wrist elements 8 and 10. The third wrist element 13 mounted on the second wrist element 10 is rotated around the third axis B3 by the rotational driving force from the speed reducing means 15.

Similarly, a driving force is transmitted to the second drive shaft 5 from the driving source including the second motor M5 to rotate the second drive shaft 5. The driving force is transmitted to the speed reducing means 12 arranged in the first wrist element 8. The second wrist element 10 mounted on the first wrist element 8 is rotated around the second axis B2 by the rotational driving force from the speed reducing means 12.

Since the speed reducing means 15 for the third wrist element 13 is supported on the second wrist element 10 around the second axis B2, which supports the third wrist element 13 around the third axis B3, when the second wrist element 10 is rotated by the second driving system, the third wrist element 13 is rotated around the second axis B2 with the rotation of the second wrist element 10 so that a rotational force to rotate the third wrist element 13 around the third axis B3 or the third drive shaft 6 around its axis is inputted to the third driving system.

Therefore, if the third motor M6 connected to the third drive shaft 6 is not rotated for canceling the rotation of the third wrist element 13, the third wrist element 13 is rotated unintentionally. Thus, the third motor M6 is rotated for canceling the rotation of the third wrist element 13 around the third axis B3 when the second wrist element 10 is rotated so that the third wrist element 13 is not rotated around the third axis B3 when the second wrist element 10 is rotated around the second axis B2.

Similarly, a driving force is transmitted to the first drive shaft 4 from the driving source including the first motor M4 to rotate the first drive shaft 4. The driving force is transmitted to the first wrist element 8 to be rotated around the first axis B1.

Since the second drive shaft 5 and the third drive shaft 6 are supported on the first drive shaft 4 rotatably around their respective axes to be displaced from the first axis B1, when the first wrist element 4 is rotated by the first driving system, the second and third drive shafts 5 and 6 are rotated around the first axis B1 with the rotation of the first drive shaft 4 so that rotational forces are generated to rotate the second and third driving shafts 5 and 6 around their respective axes.

So as to cope with the rotation of the second and third dive shafts 5 and 6 with the rotation of the first drive shaft 4, a structure in which driving source units including the second motor M5 for driving the second drive shaft 5 and the third motor M6 for driving the third drive shaft 6 are rotatable with the first drive shaft 8 around the first axis B1 may be adoptable.

However, in adopting the above structure it is necessary to arrange the driving source units including the second motor M5 and the third motor M6 to be rotatable with respect to the wrist base 7 around the first axis B1. It is a matter of course that such structure is complicated and it is difficult to arrange cables for the driving sources.

According to this embodiment of the present invention, the annular second gear 16 in mesh with the first gear 17 attached to the end of the second drive axis 5 is provided and supported on the wrist base 7 rotatably around the first axis B1, and the fourth gear 18 in mesh with the third gear 19 attached to the end of the third drive shaft 6 is provided and supported on the wrist base 7 rotatably around the first wrist axis B1, so that the second drive shaft 5 and the third drive shaft 6 are supported to be revolvable around the first axis B1 with the rotation of the first wrist element 8 around the first wrist axis B1.

When the second drive shaft 5 and the third drive shaft 6 are revolved around the first axis B1 with the rotation of the first drive shaft 4 around the first drive shaft B1, the second motor M5 and the third motor M6 connected to the second and third drive shafts 5 and 6, respectively, are driven to rotate the second gear 16 and the fourth gear 18 so as to cancel the rotation of the second drive shaft 4 and the third drive shaft 6 around their respective axes, so that the second and third wrist elements 10 and 13 are not rotated around their respective axes with the rotation of the first wrist element 8 when the first wrist element 8 is rotated.

The above description is made on a robot wrist of in-line type but the wrist driving mechanism of the present invention can be applied to a robot wrist of offset type.

According to the present invention, the second and third drive shafts are arranged in the hollow first drive shaft, and supported separately and displaced from the first drive shaft with predetermined distances so that a space for arranging the cables and pipes in the robot arm is secured.

Further, the drive source unit including the motors for driving the first, second, third axes can be arranged fixedly on the wrist mounting base to avoid a complicated structure, by providing an annular second gear supported rotatably on the wrist mounting base around the first axis and engaged in mesh with a first gear attached to an end of the second drive shaft, and an annular fourth gear supported on the wrist mounting base around the first axis and engaged in mesh with the third gear attached to an end of the third drive shaft, so that the second drive shaft and the third drive shaft are revolvable around the first axis with the rotation of the first wrist element.

What is claimed is:

1. A robot wrist driving mechanism for driving a wrist mechanism provided at a distal end of a robot arm and having three degrees of freedom around first, second and third axes, comprising:
   a mounting base concentric with the first axis;
   first, second and third motors mounted to the mounting base;
   a first wrist element supported rotatably on said mounting base, concentric with and rotatable about the first axis;
   a hollow first drive shaft for transmitting a rotational driving force of said first motor to said first wrist element, relatively to said mounting base;
   a second wrist element supported rotatably on said first wrist element around the second axis;
   a second drive shaft connected to said second motor and arranged in and extending through an inner space of said first drive shaft, eccentrically with the first axis, to transmit a rotational driving force of said second motor to said second wrist element, to rotate same about said second axis relatively to said first wrist element;

a third wrist element supported rotatably on said second wrist element, concentric with and rotatable about the third axis; and a third drive shaft connected to said third motor and arranged in and extending through the inner space of said first drive shaft eccentrically with the first axis, to transmit a rotational driving force of said third motor to said third wrist element to rotate same about said third axis relatively to said second wrist element.

2. A robot wrist driving mechanism according to claim 1, further comprising:

a first gear fixed to said second drive shaft;

a second gear supported on said mounting base, rotatable about the first axis and meshing engaging said first gear;

a third gear fixed to said third drive shaft;

a fourth gear supported on said mounting base, rotable about the first axis, concentric with said second gear and meshingly engaging said third gear; and said second drive shaft and said third drive shaft being supported on said first drive shaft and rotatable about the first axis with the rotation of the first wrist element.

3. A robot wrist driving mechanism according to claim 1, wherein a region for arranging cables and/or pipes for a tool to be attached to said third wrist element is provided, extended along the first axis in the inner space of said first drive shaft.

4. A robot wrist driving mechanism according to claim 1, wherein the second and third drive shafts are concentric throughout a substantial common portion of their lengths.

5. A robot wrist driving mechanism according to claim 1, wherein the second and third drive shafts are positioned in spaced relationship relatively to each other.

6. A robot wrist driving mechanism according to claim 1, wherein the second and third drive shafts are displays from an axial, central portion of the first drive shaft to respective positions displaced radially from the first axis of the first drive shaft toward an interior sidewall portion of the hall of first drive shaft.

7. A robot wrist driving mechanism according to claim 1, wherein the second and third drive shafts are supported independently and at spaced, fixed axial positions relatively to each other and displaced from the first axis at respective, predetermined distances within the inner space of the first drive shaft.

8. A robot wrist driving mechanism according to claim 7, wherein the second and third drive shafts are not concentric with the first drive shaft and have respective, minimum diameters, sufficient to transmit respective drive forces.

* * * * *

UNITED STATES PATENT AND TRADEMARK OFFICE
CERTIFICATE OF CORRECTION

| | |
|---|---|
| PATENT NO. | : 7,028,578 B2 |
| APPLICATION NO. | : 10/401789 |
| DATED | : April 18, 2006 |
| INVENTOR(S) | : Masaaki Uematsu et al. |

It is certified that error appears in the above-identified patent and that said Letters Patent is hereby corrected as shown below:

Column 1, Line 15, change "cables/popes" to --cables/pipes--.

Column 3, Line 8, After "embodiment" insert --,--.

Column 3, Line 26, change "shafts" to --shaft--.

Column 4, Line 17, change "shafts" to --shaft 5--.

Column 5, Line 4, change "then" to "than".

Column 7, Line 19, change "rotable" to --rotatable--.

Signed and Sealed this

Fourteenth Day of November, 2006

JON W. DUDAS
*Director of the United States Patent and Trademark Office*